(12) United States Patent
Lonien et al.

(10) Patent No.: US 8,701,507 B2
(45) Date of Patent: Apr. 22, 2014

(54) METERING APPARATUS HAVING A METERING PIPETTE

(75) Inventors: Birgit Lonien, Dudeldorf (DE); Sascha Moehs, Dudeldorf (DE)

(73) Assignee: elm-plastic GmbH, Dudeldorf (DE)

( * ) Notice: Subject to any disclaimer, the term of this patent is extended or adjusted under 35 U.S.C. 154(b) by 465 days.

(21) Appl. No.: 12/892,175

(22) Filed: Sep. 28, 2010

(65) Prior Publication Data
US 2011/0072916 A1  Mar. 31, 2011

(30) Foreign Application Priority Data

Sep. 28, 2009 (DE) .......................... 10 2009 043 234
Oct. 9, 2009 (DE) .......................... 10 2009 048 847

(51) Int. Cl.
*B01L 3/02* (2006.01)
*A61M 5/00* (2006.01)

(52) U.S. Cl.
USPC .................. 73/864.13; 604/208; 422/516

(58) Field of Classification Search
USPC .......... 73/864.13, 864.14; 422/516–518, 925; 604/208–210
See application file for complete search history.

(56) References Cited

U.S. PATENT DOCUMENTS

| | | | |
|---|---|---|---|
| 2,705,494 A | | 4/1955 | Broadwin |
| 3,831,602 A | * | 8/1974 | Broadwin .................... 604/210 |
| 4,074,831 A | | 2/1978 | Roach |
| 4,084,730 A | * | 4/1978 | Franke et al. .............. 73/864.13 |
| 4,744,955 A | | 5/1988 | Shapiro |
| 5,115,816 A | * | 5/1992 | Lee ............................... 600/562 |
| 5,624,406 A | * | 4/1997 | Labouze ....................... 604/207 |
| 5,726,363 A | * | 3/1998 | Kalidindi ................... 73/864.14 |
| 6,428,750 B1 | * | 8/2002 | Rainin et al. ................. 422/516 |
| 7,329,241 B2 | * | 2/2008 | Horvath et al. .............. 604/208 |
| 2004/0162528 A1 | * | 8/2004 | Horvath et al. .............. 604/207 |
| 2007/0265580 A1 | * | 11/2007 | Tachikawa et al. ........... 604/209 |

FOREIGN PATENT DOCUMENTS

| | | |
|---|---|---|
| DE | 2343687 | 3/1975 |
| DE | 2825015 | 12/1978 |
| DE | 7934993 U1 | 5/1980 |
| DE | 3216644 | 5/1983 |
| EP | 931591 | 7/1999 |

* cited by examiner

*Primary Examiner* — Hezron E Williams
*Assistant Examiner* — Nathaniel Kolb
(74) *Attorney, Agent, or Firm* — Dilworth & Barrese, LLP.

(57) ABSTRACT

An improved metering apparatus includes a metering pipette (1) and a metering attachment (2). The metering pipette (1) includes a metering body (3) and a piston (4) which is longitudinally displaceably guided in the metering body (3). The metering attachment (2) is connected or connectable to the metering pipette (1). It includes a stop body (16) having a stop (17) for the piston (4) (FIG. 2).

11 Claims, 2 Drawing Sheets

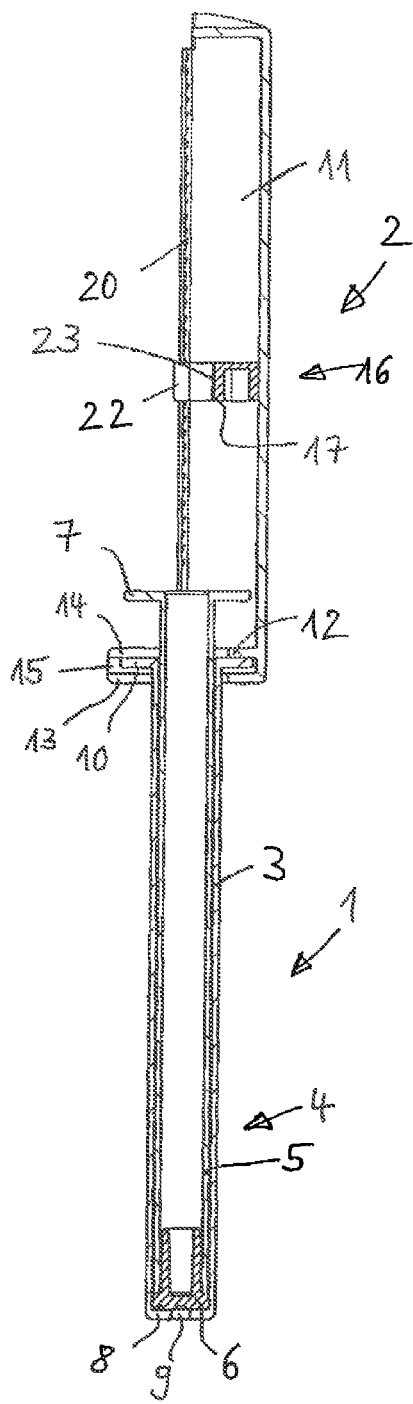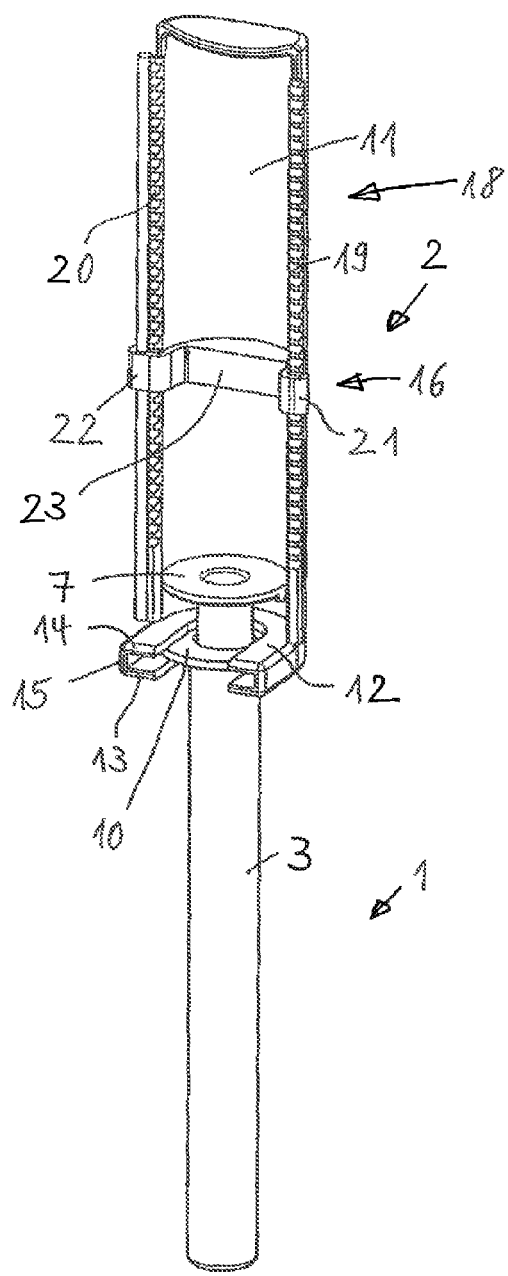

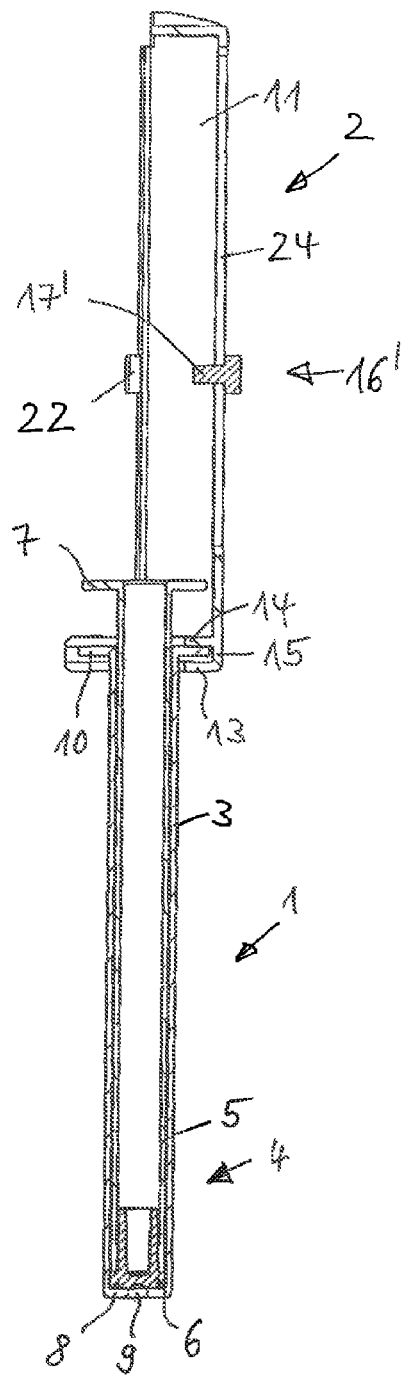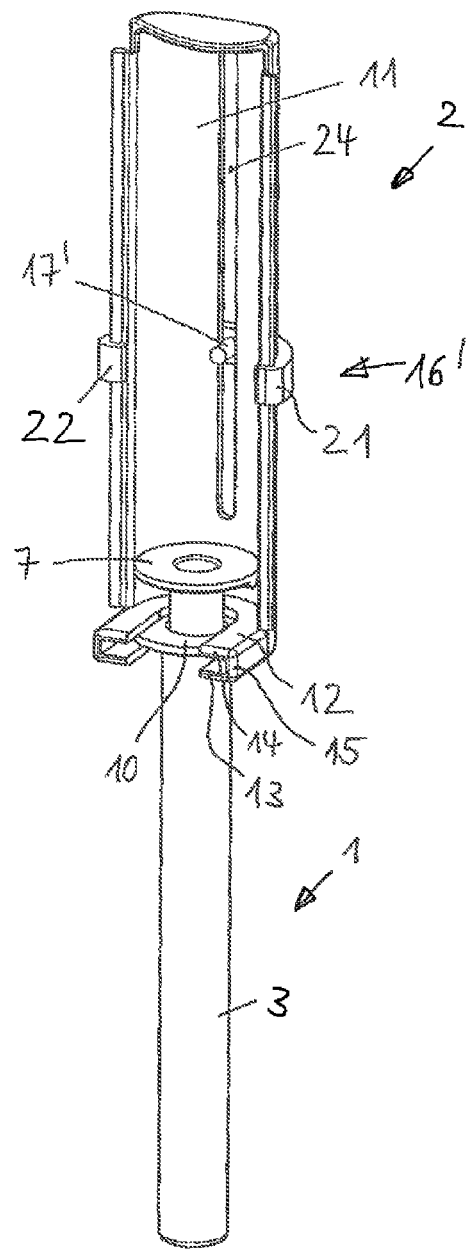

METERING APPARATUS HAVING A METERING PIPETTE

BACKGROUND OF THE INVENTION

The invention relates to a metering apparatus having a metering pipette and a metering attachment. The metering pipette includes a metering body and a piston which is longitudinally displaceable guided in the metering body.

Such metering pipettes are, already known. The metering pipette serves for the metering of liquids or preparations from a vessel, in particular from a flask. Preset volumes of liquids can be taken up from the vessel, removed and delivered at another position using a metering pipette. The volume in the metering body can be enlarged by a movement of the piston, whereby liquid can be sucked into the metering body. The metering pipette can subsequently be removed from the vessel filled with liquid. The liquid is then delivered at another position by a pressure stroke of the piston. A scale is usually located on the piston or on a part connected to the piston and the sucked in liquid volume can be measured using it.

A repeat dispenser for liquids is known from DE 32 16 644 A1, wherein the quantity of liquid can be set by a repeated pressing down of an actuation part. DE 28 25 015 A1, DE 23 43 687 B1 and U.S. Pat. No. 4,074,831 A disclose further metering apparatus; however, in each case without a separate metering attachment.

Incorrect metering amounts can occur with the previously known metering pipettes. This risk is in particular present with persons who are not able to meter liquid medication exactly due to physical and/or mental dysfunctions.

SUMMARY OF THE INVENTION

It is the object of the invention to propose an improved metering apparatus of the initially recited kind with which an incorrect metering, amount can be prevented.

This object is achieved in accordance with the invention by the features herein. The metering apparatus includes a metering attachment Which is connected or connectable to the metering pipette. The metering attachment, includes a stop body having a stop for the piston. The suction stroke of the piston is bounded by the stop at the stop body. The suction stroke of the piston can be bounded to a predetermined value.

Advantageous aspects of the invention form the subject of the description herein.

The metering attachment is preferably releasably connected or connectable to the metering pipette. It is, however, also possible that the metering attachment is non-releasably connected to the metering pipette. The metering attachment can in particular also be in one piece with the metering pipette.

It is advantageous if the stop body is adjustable. It is of advantage in this respect if the stop body is displaceable and lockable: A specific piston stroke can be set by a displacement of the stop body. This piston stroke corresponds to a specific metering volume. The stop body is preferably locked at the position at which it is located, optionally after a displacement. The locking can take place in shape-matched and/or friction-locking manner.

A further advantageous further development is characterized in that a toothed arrangement for the stop body is provided at the metering attachment.

In accordance with a further advantageous further development, the stop body can be adjusted in a friction-locking manner at the metering attachment.

A further advantageous further development is characterized in that the stop of the stop body engages through a slot in the metering attachment.

The invention further relates to a metering attachment for a metering pipette, wherein the metering attachment is connected or connectable to the metering pipette, and wherein the metering attachment includes a stop body having a stop for the piston of the metering pipette. The metering attachment can have one or more or all of the further described advantageous features.

BRIEF DESCRIPTION OF THE DRAWINGS

Embodiments of the invention will be explained in detail in the following with reference to the enclosed drawing. There are shown in the drawing FIG. 1 a metering apparatus having a metering pipette and having a metering attachment at which a toothed arrangement for the metering body is provided in a perspective view;

FIG. 2 the metering apparatus in accordance with FIG. 1 in a lateral sectioned view;

FIG. 3 a further embodiment of a metering apparatus having a metering pipette and having a metering attachment whose stop body can be adjusted in a friction-locking manner at the metering attachment in a perspective view; and FIG. 4 the metering apparatus in accordance with FIG. 3 in a lateral sectioned view.

DESCRIPTION OF THE PREFERRED EMBODIMENTS

The metering apparatus shown in FIGS. 1 and 2 includes a metering pipette 1 and a metering attachment 2 which is releasably connected to the metering pipette 1.

The metering pipette 1 includes a metering body 3 and a piston 4 which is longitudinally displaceably guided in the metering body 3. The piston 4 comprises a plunger 5 and a cuff 6. The plunger 5 includes a tube in whose lower end the cuff 6 is inserted. The cuff 6 is manufactured from a material which is sealing with respect to the metering body 3. The plunger 5 has a stop 7 at its upper end remote from the cuff 6. The stop 7 is disk-shaped. It is designed as an outwardly facing flange.

The metering body 3 has at its lower end a base surface 8 at whose center an opening 9 is provided through which liquid can flow in and an out again. The metering body 3 furthermore has a stop 10 at its upper end. The stop 10 is disk-shaped. It is designed as an outwardly facing flange.

The metering attachment 2 includes a semi-cylindrical body 11 and a connection part 12 which is provided at the lower end of the semi-cylindrical body 11. The body 11 can, however, also be made in another form, for example angled, triangular, quadrangular, hexagonal or in any other form. The connection part 12 is made in U shape, with the U extending transversely to the longitudinal axis of the metering body 3 and of the piston 4 of the metering pipette 1. The connection piece 12 furthermore has a U-shaped section whose limbs 13, 14, which are connected to one another by the base 15, enclose the disk-shaped stop 10 of the metering body 3. The disk-shaped stop 10 can be inserted laterally into the double U-shaped connection part 12 of the metering body 3, as shown in FIGS. 1 and 2. The metering attachment 2 is releasably connected to the metering pipette 1 in this manner.

The metering attachment 2 includes a stop body 16 whose lower side forms a stop 17 for the piston 4. The stop body 16 is releasably connected to the metering attachment 2. It is adjustable at the metering attachment 2.

A toothed arrangement 18 for the stop body 16 is provided at the metering attachment 2. The toothed arrangement 18 comprises two rows of teeth 19, 20 which are provided at the end edges of the semicylindrical body 11. It is, however, also possible only to provide one of the two rows of teeth 19, 20 and not to provide the other end edge of the semicylindrical body 11 with a row of teeth. The rows of teeth 19, 20 extend parallel to one another and spaced apart from one another and parallel to the longitudinal direction of the metering attachment 2 and of the metering pipette 1. Lugs 21, 22 are shaped at the stop body 16 which engage around the rows of teeth 19, 20 and in whose interiors in each case one or more teeth are present which latch with corresponding teeth of the rows of teeth 19, 20. In another respect, the outer periphery of the stop body 16 extends substantially parallel to the inner contour of the semicylindrical body 11. The stop body 16 furthermore has a chord surface 23 which projects into the interior of the semicylindrical body 11 and whose lower side forms the abutment 17 for the piston 4.

In operation, the stop body 16 can be adjusted to a specific level by which a specific stroke of the piston 4 and thus a specific volume of the metering pipette 1 are fixed. In the suction stroke, the piston 4 is moved upwardly until the stop 7 of the plunger 5 abuts the stop 17 of the stop body 16. The suction volume is fixed by this bounding of the suction stroke. The sucked-in volume can then be delivered at another position again.

In the modified embodiment in accordance with FIGS. 3 and 4, corresponding parts are provided with the same reference numerals so that they do not have to be described again. No toothed arrangement is present here. The metering attachment 2 has a slot 24. The slot 24 is provided in the semicylindrical body 11. It extends parallel to the longitudinal direction of the metering attachment 2 and of the metering pipette 1. It is at the center of the semicylindrical body 11. The stop body 16' is located outside the semicylindrical body 11. The lugs 21, 22 of the semicylindrical body 16 are held by friction locking at the corresponding edges of the semicylindrical body 11.

The stop body 16 has a pin which projects inwardly and which engages through the slot 24. The pin forms the stop 17' for the piston 4.

In operation, the stop body 16' is pushed into the desired position. On the suction stroke, the stop 7 of the plunger 5 abuts the stop 17' of the stop body 16 on the upward movement of the piston 4.

It is possible to configure the piston 4 in one part. In this case shaped in one piece at the lower end of the plunger 5

A secure and exact metering of liquid medication is in particular made possible by a metering pipette by the invention. This is in particular of importance for vision-impaired persons and for persons with physical and/or mental handicaps such as dementia, Alzheimer's or Parkinson's. The metering attachment can be plugged onto the metering body of the metering pipette. The quantity of medication to be administered can be preset, for example by a physician or by a carer, by the stop body forming an abutment. Due to the stop body, the plunger of the piston can only be pulled out of the metering body up to the level of the stop body. The quantity to be metered by the pipette is thus also limited. No over-metering or incorrect metering amount can occur. A scale can be provided at the metering attachment, in particular in the inner region of the metering attachment. The metering can, however, also be fixed by the pulling of the plunger out of the pipette since a scale is usually applied to the plunger of the piston.

The invention claimed is:

1. A metering apparatus having
a metering pipette (1) which includes a metering body (3) and a piston (4) which is longitudinally displaceably guided in the metering body (3); and
a metering attachment (2) which is connected or connectable to the metering pipette (1) and includes a stop body (16, 16') having a stop (17, 17') for the piston (4), wherein
the metering attachment (2) has a semi-cylindrical body (11) with a connection part (12) at one end thereof for fixed connection to the metering body (3),
the metering attachment (2) is externally situated upon the pipette (1) without additional covering such that the stop body (16, 16') is accessible from the open side of the semi-cylindrical body (11) upon the metering attachment (2) at all times,
the metering attachment (2) contains a scale displayed thereon, and the piston (4) has a disk-shaped stop (7) positioned on an upper end thereof and arranged, together the stop body (16, 16'), to prevent the piston (4) from being pulled out of the metering body (3) further than a level of the stop body (16, 16') on the metering attachment (2), by the stop (7) and stop body (16, 16') contacting each other at said level.

2. A metering apparatus in accordance with claim 1, wherein the suction stroke of the piston (4) is bounded by the stop (17, 17').

3. A metering apparatus in accordance with claim 1, wherein the stop body (16, 16') is adjustable.

4. A metering apparatus in accordance with claim 1, wherein the metering attachment (2) is releasably connected or connectable to the metering pipette (1).

5. A metering apparatus in accordance with claim 4, wherein the metering body (3) has a disk-shaped stop (10) at an upper end thereof and the connection part (12) has a U-shaped section with limbs (13, 14) connected to one another through a base (15) and enclosing the disk-shaped stop (10) when the disk-shaped stop (10) is positioned therebetween.

6. A metering apparatus in accordance with claim 1, wherein a toothed arrangement (18) for the stop body (16) is provided at the metering attachment (2).

7. A metering apparatus in accordance with claim 1, wherein the stop body (16') is adjustable in a friction-locking manner at the metering attachment (2).

8. A metering apparatus in accordance with claim 7, wherein the stop (17') of the stop body (16') engages through a slot (24) in the metering attachment (2).

9. A metering apparatus in accordance with claim 8, wherein the stop (30') has lugs (21, 22) held by friction-locking at corresponding edges of the semi-cylindrical body (11).

10. A metering apparatus in accordance with claim 6, wherein the stop body (16) comprises lugs (21, 22) shaped to engage around respective rows of teeth (19, 20) of the toothed arrangement (18) and extending substantially parallel to an inner surface of the semi-cylindrical body (11).

11. A metering apparatus in accordance with claim 10, wherein the stop body (16) has a chord surface (23) projecting into an interior of the semi-cylindrical body (11) and whose lower side forms the stop (17) for the piston (4) and engages the disk-shaped stop (7) positioned on the upper end of the piston (4) and formed as an outwardly-facing flange from the piston (4).

* * * * *